United States Patent
Cornelius et al.

(10) Patent No.: US 7,167,486 B2
(45) Date of Patent: Jan. 23, 2007

(54) VOICE TRAFFIC THROUGH A FIREWALL

(75) Inventors: David Cornelius, Saratoga, CA (US);
Edwin J. Basart, Los Altos, CA (US)

(73) Assignee: Shoretel, Inc., Sunnyvale, CA (US)

( * ) Notice: Subject to any disclaimer, the term of this patent is extended or adjusted under 35 U.S.C. 154(b) by 726 days.

(21) Appl. No.: 09/766,027

(22) Filed: Jan. 19, 2001

(65) Prior Publication Data

US 2003/0165136 A1    Sep. 4, 2003

(51) Int. Cl.
*H04J 4/16*    (2006.01)

(52) U.S. Cl. ............................................. 370/467

(58) Field of Classification Search ............... 370/401, 370/466, 352, 260, 261, 355, 228, 351; 345/419; 711/4
See application file for complete search history.

(56) References Cited

U.S. PATENT DOCUMENTS

| | | | | |
|---|---|---|---|---|
| 6,134,235 A | * | 10/2000 | Goldman et al. | 370/352 |
| 6,470,020 B1 | * | 10/2002 | Barker et al. | 370/401 |
| 6,697,377 B1 | * | 2/2004 | Ju et al. | 370/466 |
| 6,760,309 B1 | * | 7/2004 | Rochberger et al. | 370/235 |
| 6,804,254 B1 | * | 10/2004 | Pearce et al. | 370/467 |
| 6,826,176 B1 | * | 11/2004 | Siddiqui et al. | 370/352 |
| 6,922,786 B1 | * | 7/2005 | Ong | 704/270 |

OTHER PUBLICATIONS

Douglas Comer, Internetworking with TCP/IP Principles, Protocols, and Architectures, Prentice Hall, Published 1995, 4th Edition, pp. 97-99, 197-206, 221-222, & 542-549.*
Douglas E. Comer, Internetworking with TCP/IP Principles, Protocols, and Archiitecture, Fourth Edition, Prentice Hall, dated 1995, pp. 197-202 7 209-222.*
Douglas E. Comer, Internetworking with TCP/IP Principles, Protocols, and Architectures, Fourth Edition, Prentice Hall, dated 1995, pp. 197-202 & 209-222.*
IETF, Request for Comments (RFC) 2543: "Session Initiation Protocol" (SIP) (Mar. 1999).

* cited by examiner

*Primary Examiner*—Doris H. To
*Assistant Examiner*—Robert W. Wilson
(74) *Attorney, Agent, or Firm*—Silicon Valley Patent Group LLP

(57) ABSTRACT

The number of holes that are opened in a firewall for internet telephony is limited to a first hole used for call control and a second hole used for audio traffic. Fixed destination ports for telephony traffic and call control traffics are created at a destination. Media streams are received at the telephony fixed destination port. The source of each media stream is commanded to provide a unique identifier for each media stream arriving at the destination from each source. Each media stream is identified by a unique identifier provided by the source. The unique identifier for each media stream is communicated to the destination by each source over call control. All telephony traffic is received only at the fixed destination port or telephony and all call control is received only at the fixed destination port for call control.

12 Claims, 11 Drawing Sheets

VOICE TRAFFIC THROUGH A FIREWALL

CROSS REFERENCE TO ATTACHED APPENDIX

Appendix A contains the following files in one CD-ROM (of which two identical copies are attached hereto), and is a part of the present disclosure and is incorporated by reference herein in its entirety:
Volume in drive F is VOL2
Volume Serial Number is 0A0A-FA32

```
Directory of F:\
01/17/01    12:01p      <DIR>
01/17/01    12:01p      <DIR>
01/09/01    10:49a      228,371     ms_svr.c
01/05/01    03:11p      6,959       ms_svr.h
12/01/00    03:10p      7,783       mshdr.h
12/01/00    03:10p      1,611       mstypes.h
12/01/00    03:10p      5,761       rtphdr.h
            7 File(s)           250,485 bytes
    Total Files Listed:
            7 File(s)           250,485 bytes
                            12,514,230,272 bytes free
```

The files of Appendix A form source code in the language C for implementing a media stream server, call controller and media stream control, for use with an illustrative implementation of this invention as described more completely below.

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND OF THE INVENTION

A PBX (private branch exchange) provides interconnections among internal telephone lines that are connected to telephone instruments at a single facility (such as a law office). The PBX also interconnects the internal telephone lines to a smaller number of external telephone lines (also called "trunks") of a telephone company. Such PBXs provide a number of features of the type described in, for example, "DEFINITY Communications System, Generic 1 and Generic 3 and System 75, 8410 Voice Terminal User's Guide," pages 5–8, 1994, published by AT&T GBCS Documentation Development, Middletown, N.J., 07748-1998.

There is a growing trend towards audio communications taking place over packet-switched networks, such as the Internet, instead of directly on the telephone network (that provides only circuit switching and is sometimes called "public switched telephone network (PSTN)"). Such audio communications can be facilitated by various types of devices such as: (1) specialized PBXs (also called "packet-switching PBXs") that directly connect to packet-switched networks, (2) gateways that connect circuit-switching devices to packet-switched networks and (3) software tools that connect personal computers to packet-switched networks. One example of a packet-switching PBX, as seen in FIG. 1, is described in "Intranet and IP-Based UnPBXs," Chapter 7, pages 7–16 to 7–22, in the book entitled "the UnPBX" edited by Edwin Margulies, Flatiron Publishing, Inc. 1997.

In this example, the packet-switching PBX includes one or more telephony switches 1 and 2, each of which has twelve ports that can be connected either to internal telephone lines or to external telephone lines. In addition, each of telephony switches 1 and 2 includes a digital port that is connected to an Ethernet 3 for communication therebetween. For example, if telephone instrument 4 needs to be connected to telephone instrument 5, switch 1 routes the call via Ethernet 3 to switch 2. Information carried by any call routed over Ethernet 3 is divided into a number of portions; each portion placed in a packet (such as a Universal Datagram Protocol (UDP) packet conforming to the Transmission Control Protocol (TCP) Internet Protocol (IP) used over the Internet) that is transmitted between switches 1 and 2. TCP and UDP both travel on top of the IP. TCP is a session- and connection-oriented protocol. UDP carries packets with nothing in the UDP portion itself to identify any stream, or connection.

An example of a conventional gateway for circuit-switching PBXs is an Internet Telephony Server which includes a PSTN interface board 11, as seen in FIG. 2, for connection to telephone lines (T1/E1/analog) of a PBX, and a Digital Signal Processor (DSP) card 12 that performs voice compression and/or fax processing and generates packets, and the packets are sent to an Ethernet 13 via an Ethernet card 14.

One example of a software tool for use in a personal computer is an audio conferencing tool described in "vat—LBNL Audio Conferencing Tool", published May 1996 and available at wwwnrg-ee-lbl-gov%vat. The packets generated by this tool conform to the Real-Time Transport Protocol (RTP) as described in "RTP: A Transport Protocol for Real-Time Applications", Network Working Group, January 1996, which is available from the Internet Engineering Task Force (IETF) website as Request for Comment (RFC) 1889, www-ietf-org%rfc%rfc1889.txt?number=1889. RTP provides end-to-end network transport functions suitable for applications transmitting real-time data, such as audio, video, or simulation data, over multicast or unicast network services.

Data packets sent on an RTP stream carry only a hint as to which call the data packets relate to. In RTP packets, the hint comes in the form of 32 bit (i.e., 4 byte) identifiers which help locate the generator of the data in the packet. However, as the identifier is not centrally generated, cases arise where two sources generate the same identifier, and thus 'collide' on the use of a particular pattern in these 32 bits. In this case, the sources simply choose a new identifier, and the recipients are left to figure out what has happened. RTP itself does not contain a mechanism to keep the identifiers unique.

Classical RTP requires that either all ports of the firewall be opened or that the firewall recognize that the incoming data is RTP data. Firewalls typically operate by rejecting (i.e., discarding) incoming traffic which is destined for ports (either TCP or UDP) whose operational security is not known. Essentially, the firewall closes the ports for incoming traffic unless someone (e.g., the administrator of the firewall) can vouch that the destination port has a trusted program digesting the information. With RTP, the ports are 'unspecified', so the administrator could end up with having to open up many, or all of the UDP ports to allow the voice traffic to come in. While a field in the IP header of a UDP packet explicitly states that the following payload data is UDP payload data, there is no further identification in the UDP packet that the UDP payload data is RTP data. RTP data travels inside a UDP datagram as a payload of UDP.

Since there is no tag or identifier in the incoming data packet itself that identifies the incoming data as RTP data, the destination must be informed that incoming data is RTP data. If the receiving system does not know that data coming in on a particular port is RTP data, then the receiving system usually discards such data. There are a few heuristics which can be applied to the RTP header to take a guess as to whether it is RTP. Routers use these heuristics to compress RTP headers, but their compression techniques, when inadvertently applied, are not destructive. However, the routers are only looking for compressible data and not looking at the data in order to route the data or identify the data as belonging to any particular call's media stream. The routers merely seek to exploit the compressible aspects of an RTP header, if in fact, there is such a header on a particular packet.

SUMMARY OF THE INVENTION

A method of sending telephony traffic over Ethernet is disclosed. A fixed destination port for telephony traffic is created at a destination. A fixed destination port for call control traffic is also created at the destination. A plurality of media streams are received at the telephony fixed destination port. The source of each media stream is commanded to provide a unique identifier for each media stream arriving at the destination from each source. Each media stream is identified by a unique identifier provided by the source. Transmission of packetized data to a fixed destination port for all audio traffic and all call control traffic allows the number of holes in the firewall of a system to be kept to a minimum.

A method of limiting telephony traffic to a single hole in a firewall is also disclosed. A fixed destination port is created for telephony traffic at a destination. A first hole is opened in a firewall corresponding to the fixed destination port for telephony. A fixed destination port is created for call control traffic at the destination. A second hole in the firewall is opened corresponding to the fixed destination port for call control. A plurality of media streams are received at the telephony fixed destination port. The source of each media stream is commanded to provide a unique identifier for each media stream arriving at the destination from each source. Each media stream is identified by a unique identifier provided by the source of each media stream.

This invention will be more fully understood in light of the following detailed description taken together with the accompanying drawings.

BRIEF DESCRIPTION OF THE DRAWINGS

Use of the same reference symbols in different figures indicates similar or identical items.

DETAILED DESCRIPTION OF THE PREFERRED EMBODIMENTS

Figure 1:
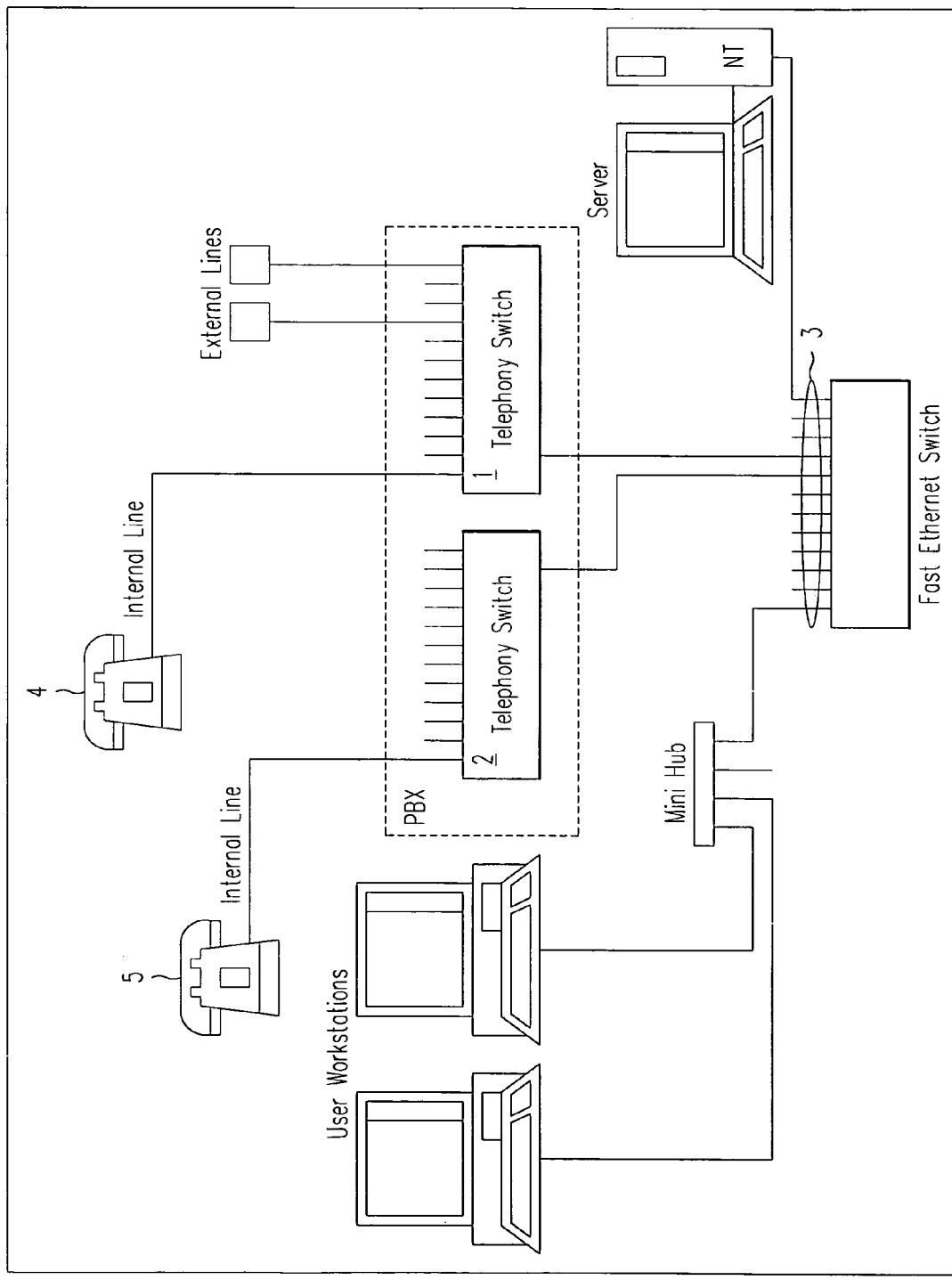
FIG. 1 illustrates a high-level block diagram of a packet-switching PBX of the prior art.
Figure 2:
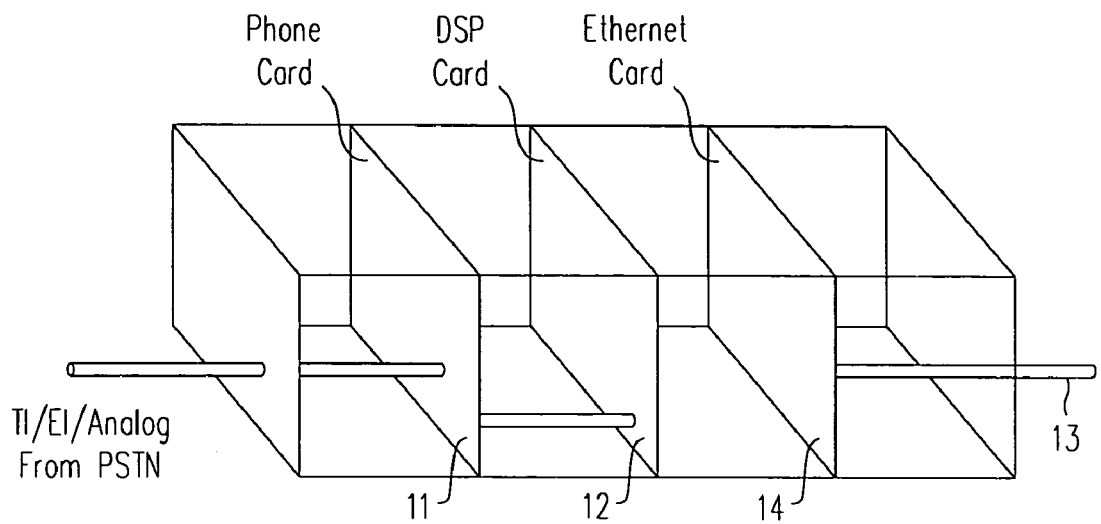
FIG. 2 illustrates, in a three-dimensional cut-away view, the cards included in a gateway of the prior art.

IP nodes (e.g., telephony switches) are connected by IP networks over a number of different systems, e.g., Ethernet 10/100/1G, T1, DSL, Cable, PSTN, etc. Audio communication over packet-switched networks can involve an audio stream passing through a firewall. Firewalls exist at the boundaries between a trusted internal internet and an untrusted external internet. Firewalls are controlled by a combination of software and hardware. A firewall is programmed to allow packets destined for known ports to enter those ports and to reject those packets with unknown destination ports. Firewalls protect against incoming traffic only and have filtering rules as to what packets are to be let through. Filtering rules are implemented by a system manager. Incoming traffic authorized by the filtering rules of the firewall to enter the destination computer system is said to pass through a "hole" in the firewall. Packets in the incoming traffic are pre-set at the source computer with the target port number and/or IP address of the destination computer. If the firewall guarding the destination system does not recognize the incoming packets as authorized to enter the destination port number (i.e., not authorized to pass through the "hole" in the firewall) to which the packet has been directed by the source computer, the packet will not be allowed through (i.e., processed any further) and the packet will be dropped.

One goal of the system administrator of a computer network is to limit unauthorized outside access to the computer system. The system administrator starts with a completely closed system (i.e., no outside traffic is allowed in) and opens up a number of ports to allow access for web traffic and Telnet access. TCP port 80 is the port number commonly assigned by system administrators for incoming web traffic. Other port numbers may be used for File Transfer Protocol (FTP) and Telnet access. The system administrator obtains these commonly assigned port numbers from industry guidelines which suggest which port numbers should be used for a particular use. The Internet Assigned Numbers Authority (IANA) houses the many unique parameters and protocol values necessary for operation of the Internet and its future development. These parameters and protocol values may be found at www-iana-org%numbers.htm. Types of numbers range from unique port assignments to the registration of character sets. A copy of the list of port numbers may be found at www-isi-edu%in-notes%iana%assignments%port-numbers. It is from these lists that port numbers were obtained for use in conjunction with an embodiment of the invention, as seen below.

In accordance with the invention, an embodiment of the invention includes using RTP protocol in a manner that allows all incoming audio traffic to be directed through a single "hole" in the firewall (i.e., directed to one specific port) set aside for incoming audio traffic at a destination system.

As data packets sent via UDP are not self-identifying in RTP, it is necessary for the source system to send a control message via TCP to the destination system that identifies the incoming media stream of data packets. The control message identifies the data packets by the IP address of the source system and the source port number from which the data packets originate. The call control message is sent via a call control mechanism that informs the destination (i.e., receiving) system which data packet corresponds to a particular call (i.e., media stream).

The call control mechanism communicates information about the call (i.e., call identifier, source port number, source IP address, destination port number, destination IP address) to both the source and destination systems. The communication of this call control information between systems is referred to as "call control". Call control is transmitted between the source and destination systems through a second "hole" in the firewall (i.e., a second specific port in each system) set aside for all call control traffic. This second hole uses a destination port number set aside for TCP protocol. The destination port number for TCP is always a specific port number (e.g., port number 5002) chosen by the user for system-wide use. The call control stream from the source (i.e., sender) to the destination (i.e., receiver) identifies the source IP address, the source port number of the sender and a call identifier (which is a token 32 bits) to the receiver. A control signal can be received either before or after the data traffic starts. However, the receiving IP telephony switch discards any data traffic received before the control signal is received as the switch is sensitive to both IP address and port number. RTP allows a new source port number to be used every time a telephone call is established. The source and destination media streams are identified by their IP addresses and UDP port numbers. The destination port number for UDP is always a specific port number (e.g., port number 5004) chosen by the user for system-wide use, but the source port number for UDP traffic varies for each call. This specific port number is chosen pursuant to the IANA guidelines mentioned above. Each media stream has its own unique pair of IP addresses and UDP source port number. The destination port number chosen by the user for the call control stream on TCP is port 5002 but any port number may be chosen by the user, pursuant to the IANA guidelines mentioned above. The actual call control mechanism used to transport the above-identified information is not a critical aspect of one embodiment; the only addition to a normal call control mechanism, in one embodiment, is transfer of information relating to the source port number of the sender.

In accordance with one embodiment, a call control mechanism may be based on International Telecommunication Union (ITU) Recommendation H.323. The ITU is an international organization within which governments and the private sector coordinate global telecom networks and services. ITU Recommendation H.323 (11/00) "Packet-Based Multimedia Communications Systems" discloses a conventional method of transmitting destination port information over call control. This method may be modified to transfer source port information of a sender, as described elsewhere herein.

In accordance with one embodiment, the call control mechanism is based on Request for Comments (RFC) 2543: "Session Initiation Protocol" (SIP) (March 1999) developed by the Internet Engineering Task Force (IETF), an international community of network designers, operators, vendors, and researchers concerned with the evolution of the Internet architecture. SIP discloses an application-layer control (signaling) protocol for creating, modifying and terminating sessions with one or more participants. These sessions include Internet multimedia conferences, Internet telephone calls and multimedia distribution. Members in a session can communicate via multicast or via a mesh of unicast relations, or a combination of these. SIP Invitations used to create sessions and carry session descriptions which allow participants to agree on a set of compatible media types. SIP supports user mobility by proxying and redirecting requests to the user's current location. Users can register their current location. SIP is not tied to any particular conference control protocol. SIP is designed to be independent of the lower-Layer transport protocol and can be extended with additional capabilities. RFC 2543 is available at www-ietf-cnri.reston-va-us% rfc%rfc2543.txt?number=2543 and discloses a conventional method of transmitting destination port information over call control. This method may also be modified to transfer source port information of a sender, as described herein.

This system of media stream identification, based on pairs of IP addresses and UDP source port numbers, is not limited to audio traffic, but is also applicable to video stream data.

Figure 3:
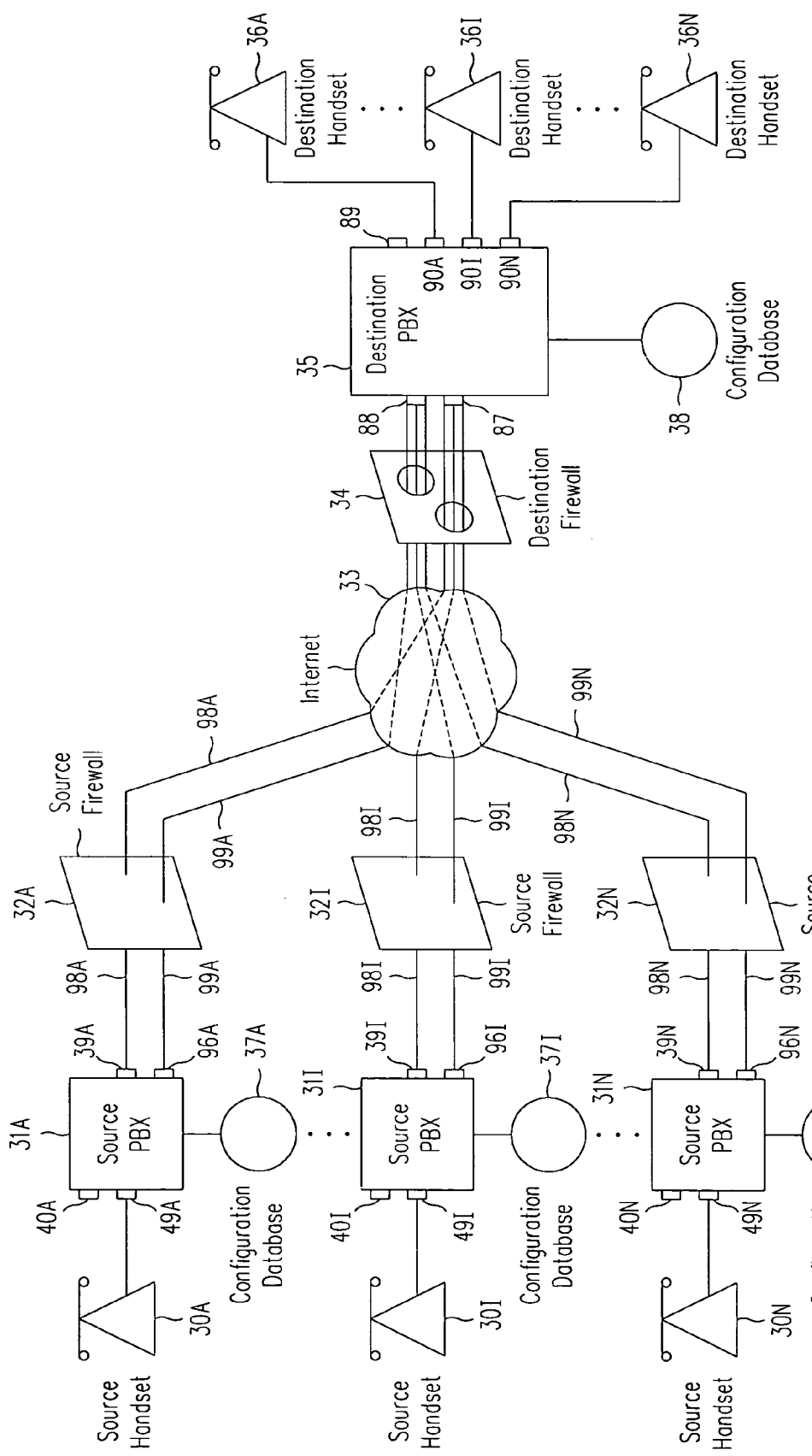
FIG. 3 illustrates a telephony system in which media and call control streams must pass through a firewall.

In accordance with the invention, FIG. 3 illustrates an example of a telephony system in which packets containing audio information must pass through a firewall. The system includes a plurality of source telephone instruments 30A, . . . 30I, . . . 30N ($A \leq I \leq N$ where N is an integer), a plurality of source PBX 31A, . . . 31I, . . . 31N (where $A \leq I \leq N$), a plurality of source firewalls 32A, . . . 32I, . . . 32N (where $A \leq I \leq N$), Internet 33, destination firewall 34, destination PBX 35, and destination telephone instruments 36A, . . . 36I, . . . 36N (where $A \leq I \leq N$) connected to PBX 35. The term "source" is used merely to illustrate the system from which a call was initiated and the term "destination" likewise merely refers to the system to which a call was directed. Each PBX 31A, . . . 31I, . . . 31N, 35 has a configuration database 37A, . . . 37I, . . . 37N (where $A \leq I \leq N$), 38 which contains a list of the port numbers of all extensions in the system. For example, configuration database 37A of source PBX 31A contains a list of port numbers for extensions of PBXs 31A, . . . 31I, . . . 31N, 35. Likewise, configuration database 38 of the destination PBX 35 contains a list of port numbers for extensions of both PBXs 31A, . . . 31I, . . . 31N, 35. As stated in more detail below, the configuration databases 37A, . . . 37I, 37N, 38 and firewall settings may be adjusted at any time by a system administrator. For example, a port number could be set in a configuration database 37A, . . . 37I, . . . 37N, 38 at the time the hole is inserted in the firewall by the system administrator. Media stream Ethernet taps 39A, . . . 39I, . . . 39N (where $A \leq I \leq N$) and call control stream Ethernet taps 96A, . . . 96I, . . . 96N (where $A \leq I \leq N$) are located between the Internet 33 and PBX 31A, . . . 31I, . . . 31N. Ethernet taps 87, 88, dedicated to media stream traffic and call control stream traffic, respectively, are located between destination firewall 34 and PBX 35. There are handset taps 49A, . . . 49I, . . . 49N (where $A \leq I \leq N$) located between telephone handsets 30A, . . . 30I, . . . 30N and PBXs 31A, . . . 31I, . . . 31N. Handset taps 90A, . . . 90I, . . . 90N (where $A \leq I \leq N$) are located on PBX 35. A line from each handset tap 90A, . . . 90I, . . . 90N runs to a respective destination handset 36A, . . . 36I, . . . 36N. PBXs 31A, . . . 31I, . . . 31N also have taps 40A, . . . 40I, . . . 40N (where $A \leq I \leq N$) for analog links to the PSTN. PBX 35 also has a tap 89 for analog links to the PSTN. Media streams 98A, . . . 98I, . . . 98N (where $A \leq I \leq N$) and call control streams 99A, . . . 99I, . . . 99N (where $A \leq I \leq N$) run from each PBX 31A, . . . 31I, . . . 31N to the Internet 33. The media streams 98A, ... 98I, ... 98N pass through a different hole in destination firewall 34 than call control streams 99A, ... 99I, ... 99N. However each media stream 98A, ... 98I, ... 98N passes through a common hole in firewall 34 to enter Ethernet tap 87 and every call control stream 99A, ... 99I, ... 99N passes through a common hole in firewall 34 to enter Ethernet tap 88. This system can be used with, but is not limited to, one-on-one calls, conference calls involving more than two phones, calls from a single source to multiple extensions at a destination, a call from a single source to individual extensions at multiple destinations, and multiple independent telephone calls (e.g., Call A from Source A is directed to extension 3 at Destination C while Call B from Source B is directed to extension 5 at Destination C).

For purposes of clarity, the following description relates to a call from one telephone instrument to another telephone instrument. The initiator of a telephone call picks up the handset of the first telephone 30A. Generation of a dial tone occurs in the telephony switch to which the handset is connected. The media stream is not established until the user 'dials a number', e.g., the three-digit extension of a colleague in a remote office. Generators of the media stream always send the data to the same destination port number regardless of which PBX to the media stream is directed to. Each PBX is set to receive incoming traffic at the same destination port number every other PBX in the system is set to receive incoming traffic at. This UDP destination port number for the incoming RTP data is compiled into computer code (e.g., language C) and programmed into each PBX. In the alternative, the destination port number for UDP traffic could be chosen at runtime and sent between telephony switches, i.e., the destination port number could be chosen during the runtime of the telephony switch, as opposed to the destination port number being assigned some value during the compilation of software which runs in the switch. Software compilation occurs at the factory of the switch manufacturer. The resulting software program is loaded into the telephony switch. After power is applied to the switch, the program runs, and eventually, assigns these port numbers. This destination port number is provided to the administrator of the firewall who then configures the firewall to allow incoming RTP data traffic through to the designated destination UDP port number. The ultimate destinations of the media streams may differ but the same destination port number on each PBX is used for incoming traffic. The initiator of the call then dials a desired number or extension and the telephone 36N at the destination rings regardless of where the destination telephone 36N and its associated PBX 35 are located. The telephone number dialed is the destination ID of the telephone 36N to which the call is directed (e.g., going to a particular destination PBX 35 and physical port number (e.g., port number 3) of the destination PBX 35). The physical 'ports' on the PBX are also referred to as 'slots' (i.e., port number 3 is slot number 3). The dialed number is sent to a call control mechanism located within the PBX 31A connected to the call initiator's telephone. The call control mechanism uses programmed instructions to determine the destination IP address from the dialed number by searching for the dialed number in the configuration database 37A of the PBX 31A. The search yields the IP address and a unique 32-bit identifier of the destination (i.e., dialed) telephone 36N. Each telephone extension in the system is associated with an IP address as well as a 32-bit identifier unique to that extension. The call control mechanism sends messages over call control stream 99A to destination PBX 35 using TCP protocol. In order for media stream 98A to be received at the destination telephone 36N, media stream 98A must pass through a firewall 34 guarding the destination system. Although there might be a firewall 32A guarding the call initiator's system, the firewall 32A guarding the call initiator's system ignores media stream 98A from the caller's PBX 31A to the receiver's PBX 35 as the call is outgoing and not incoming. However, as RTP is unidirectional, the receiver will generate its own media stream to communicate with the caller. This second media stream (not shown for clarity) must pass through the firewall 32A guarding the call initiator's system. The receiver of the call (i.e., destination telephone 36N) is informed of the source port number for each individual call originating elsewhere by an external mechanism (i.e., a call control mechanism) pre-programmed into and distributed across all of the switches. Each PBX involved in a telephone call functions as part of the call control, as stated in more detail below. The individual PBX's call control function depends on whether the PBX is the PBX sending a call or the PBX receiving a call. The call control mechanism is programmed such that a source port number identifying the source of a call is generated by the source PBX 31A and then communicated to the destination PBX 35. This call control is done through a second hole in the destination firewall through which the TCP messages pass to the call control mechanism in the destination PBX 35. The two PBX 31A, 35 communicate with each other and exchange messages through the call control holes in the firewalls 32A, 34. The destination PBX 35 then knows a call is coming and generates signals to the destination telephone 36N. It is the destination PBX 35 that rings the attached telephone 36N. The media stream starts when the destination telephone 36N is answered. Each firewall needs two holes: one for TCP port number 5002 and one for UDP port number 5004. The distributed call control (i.e., the communication of call control between the PBXs involved in the call) is communicated to TCP port number 5002; consequently passing through the hole in the firewall corresponding to TCP port number 5002. The media streams (all of them) are transmitted through the firewall hole for UDP port number 5004. Call control communication is transmitted over TCP protocol to TCP port number 5002 and the media stream RTP is transmitted over UDP protocol to UDP port number 5004. Essentially, the port number and IP address of the sending PBX 31A is communicated to the receiving PBX 35. The receiving PBX 35 uses this information to identify the call (i.e., the receiving PBX 35 can find all other data associated with the call based on this information alone).

The 32-bit call identifier is unique across all PBXs within a single customer environment. Every time a new call is initiated, a new call identifier is created. For example, the new call identifier may be created by incrementing the previous call identifier by one. The call identifier, used as a "tag", or "index" for the call, is unique among all other extant calls in the telephony system. Inside the system, there are several tables that contain information about pieces and parts of each call. These tables usually contain the call identifier, so that any particular piece can be correlated with the call. The call may include several media streams, each stream with its own endpoint port number. But, wherever a data structure describes such a media stream, that data structure is indexed (i.e., tagged) with the call identifier.

An endpoint exchange (i.e., the communication of the source port number to the destination PBX 35) occurs when the receiver of the call picks up the telephone 36N. The source port number is generated by the initiator PBX 31A and retained in the initiator PBX switch 31A. The call control mechanism is used to establish the two independent media streams, by symmetric exchange of IP address and UDP port number pairs. The result is two media streams; the initiator's voice to the receiver's earpiece and the receiver's voice to the initiator's earpiece. The symmetric establishment of the two media streams take place concurrently, not sequentially, and occurs before the receiving telephone is answered. Since the destination port number of each PBX 31A, 35 is always the same (e.g., TCP port 5002 and UDP port 5004), neither the initiator's firewall 32A nor the receiver's firewall 34 needs to be adjusted.

In accordance with the invention, while the above call is in progress, a second telephone call may be placed from handset 30I to destination handset 36A and a third call from handset 30N to destination handset 30I. The second and third calls each obtain a unique source port number in the manner outlined above. The call control communication for each call, regardless of whether the source handset is 30A, 30I or 30N, is transmitted over TCP protocol to TCP port number 5002 of PBX 35 and the media stream RTP is transmitted over UDP protocol to UDP port number 5004 of PBX 35.

Figure 6:
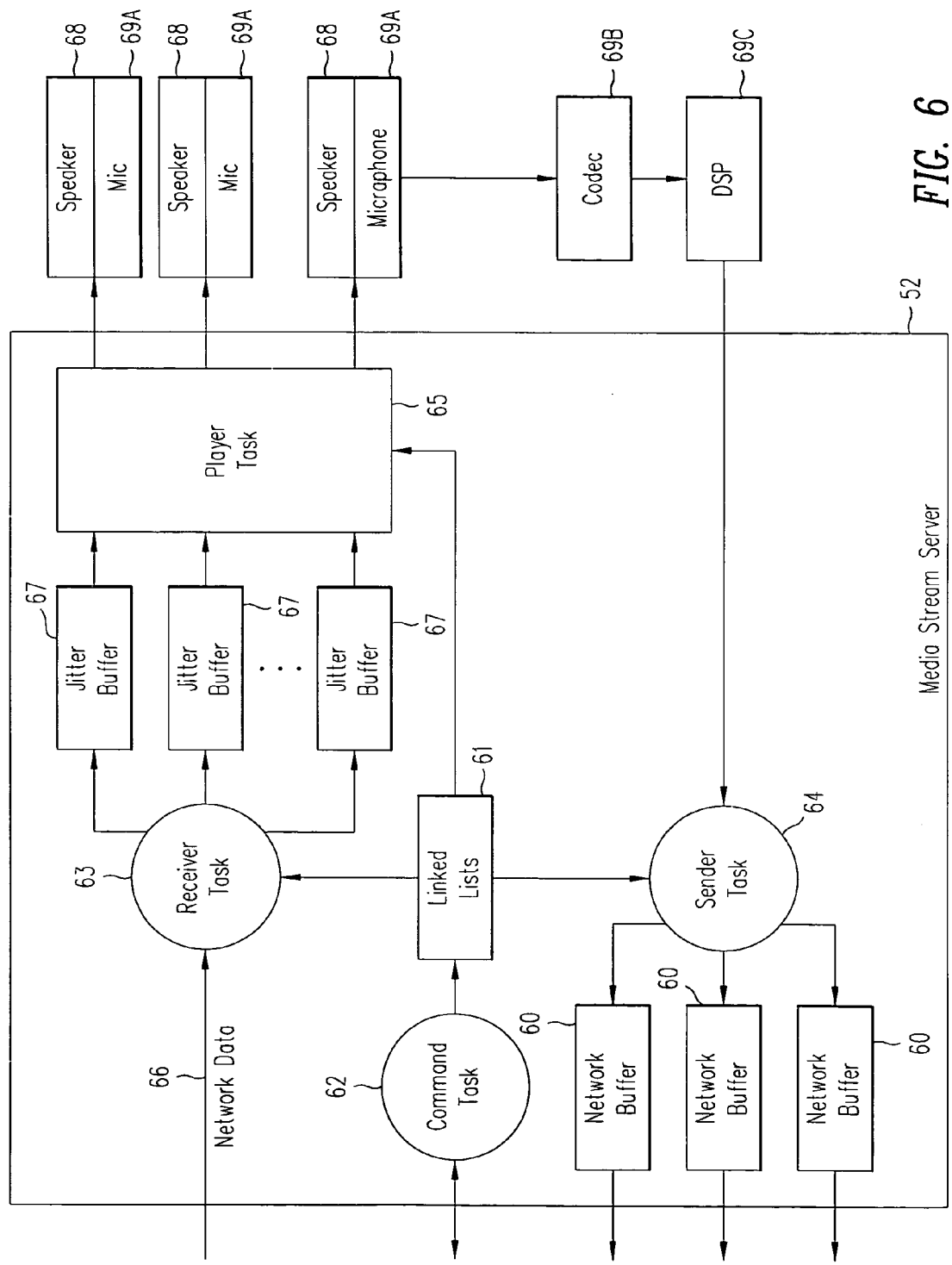
FIG. 6 illustrates an example of the operation of a media stream server.

In accordance with the invention, as seen in FIG. 6 and discussed in more detail below, two important processes are running in each PBX: a receiver task 63 and a sender task 64. The receiver task 63 takes data packets off of UDP port 5004 and sends the packets to their appropriate destination based upon source port number and source IP address. The sender task 64 generates the source port number so that each packet on a media stream may be uniquely identified for the receiver task 63. Each PBX 31A, . . . 31I, . . . 31N, 35 performs the sender task 64 for each media stream 45, 46 generated by PBX 31A, . . . 31I, . . . 31N, 35 and each PBX 31A, . . . 31I, . . . 31N, 35 performs the receiver task 63 for each media stream 45, 46 received by PBX 31A, . . . 31I, . . . 31N, 35.

There is a potential timing delay because data could arrive at firewall 34 of the destination system before the destination system is notified that data is coming. If that incoming data arrives before the call control mechanism is made aware of an incoming call, the incoming data is dropped by the destination system. The timing delay occurs with respect to the timing of (a) the source port being communicated to the receiving system and (b) the media stream flowing to that receiving system. For example, if the media stream packets for a new stream arrive at the receiving system before the distributed call control has communicated the new source port number, then the receiving PBX 35 drops these packets as the receiving PBX 35 requires the source port number to identify which conversation the media stream belongs to. The receiving PBX 35 must be informed of the source parameters (i.e., port number & IP address) as these parameters identify the call and where data for the call is originating.

In accordance with the invention, a system can be run with one or more PBX. Two PBXs can be in the same building or in different buildings or even in different cities and the collection of these PBXs, and associated equipment, make up the phone system. The phone systems (PBXs) communicate with each other via transmission control protocol (TCP) internet protocol (IP). TCP/IP and Universal Datagram Protocol (UDP)/IP are standard methods of sending data (e.g., voice), including streaming media. In the layering approach to networking protocols, TCP travels on top of IP. UDP also travels on top of IP. Layering of network protocols is common practice and well-known in the art. Voice data is usually sent over UDP/IP, although it can also be sent over TCP/IP. However, the UDP/IP domain is preferred as UDP/IP is better suited to the timely aspects of conversational audio. The salient timely aspect of conversational audio is: (1) if the data is late, the data is useless. TCP functions so as to guarantee the correct, ordered delivery of data (even in the face of network loss or temporary outages) though at the cost that the data may come slowly. In a voice system, the timely delivery of data is of high importance to maintaining a coherent conversation. A user can have a PBX at the home of the user, connected to an internet service provider (ISP) via Digital Subscriber Line (DSL). Two or more PBX communicate using their Internet addresses. As seen in FIG. 3, PBX 31A, . . . 31I, . . . 31N communicate with another PBX 35 via IP over Ethernet. The PBXs 31A, . . . 31I, . . . 31N, 35 identify each other from their IP addresses. A PBX can be hooked to T1 lines, analog lines, etc. which are controlled by the telephone companies. These "taps" 39C to PSTN (publicly switched telephone network) central office are not the focus of the instant invention as there is no IP traffic. These "taps", or ports are software configurable, so that a handset port can act as a trunk link back to the central office.

The configuration database 37A, . . . 37I, . . . 37N, 38 of each PBX 31A, . . . 31I, . . . 31N, 35 contains the IP address of all the other PBXs that make up the PBX system for a particular business and where every telephone extension in the system is located. A "telephony management system" (TMS) (not shown) is implemented as a personal computer (PC) with a user management interface, including but not limited to a Graphical User Interface (GUI), to inform the TMS about any new PBX added to the system. The TMS also updates the configuration database 37A, . . . 37I, . . . 37N, 38 of each PBX as to the IP address and telephone extensions associated with the new PBX. This information is entered into the system manually by the system administrator or someone similar who uses the management interface in the telephony management system (TMS) to add the new PBX. The exact manner of how the PBX is connected to the Internet is not essential to the practice of this invention.

In accordance with an embodiment of the invention, the following example is an illustration of the telephony system of FIG. 3. The system is comprised of an office in San Jose (SJ) and an office in Boston. Each office has a PBX 42, 41, respectively. Each PBX has the IP address of the other PBX and a list of local extensions in its configuration database. The configuration database essentially includes a table of telephone extensions and their corresponding IP addresses. In accordance with an embodiment of the invention, each PBX in the telephony system is identical; made by the same manufacturer and programmed with the same instructions and data. In an alternative embodiment, in a telephony system with at least two PBX, at least one PBX in the telephony system is made by a different manufacturer from the at least one other PBX in the system but all PBX in the system are programmed with identical instructions and data.

Figure 4:
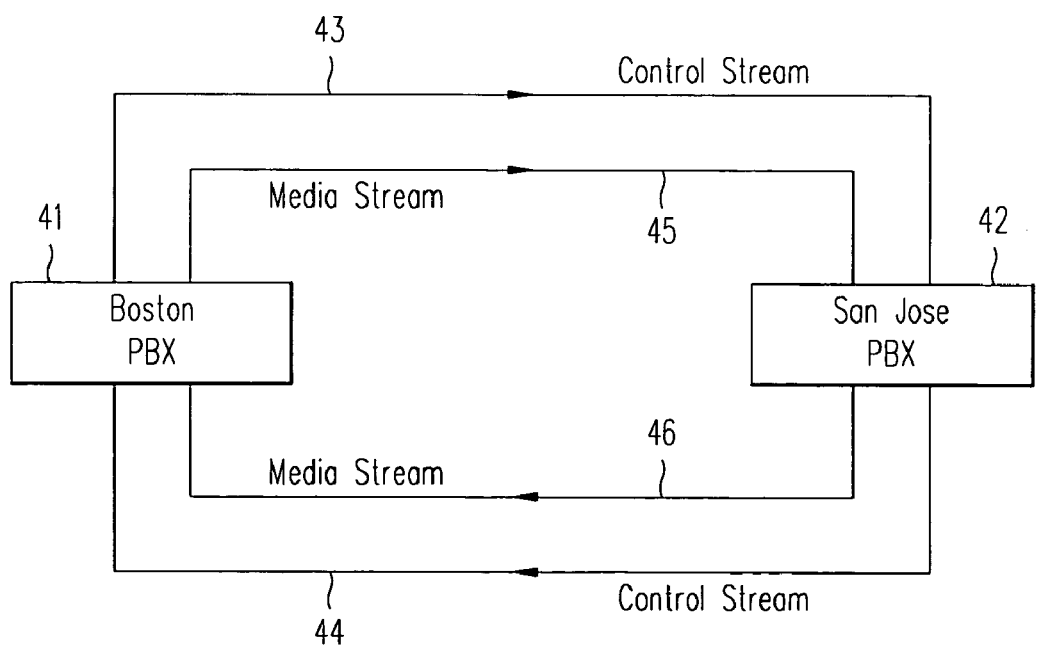
FIG. 4 illustrates media and control streams running between two locations.

In accordance with the invention, as seen in FIG. 4, two media streams and two control streams are transmitted between the Boston PBX 41 and SJ PBX 42 after a call has been established. The control stream 43 originating at the Boston PBX 41 is directed to the TCP port 5002 of the SJ PBX 42 while the media stream 45 originating at the Boston PBX 41 is directed to UDP port 5004 of the SJ PBX 42. Likewise, the control stream 44 originating at the SJ PBX 42 is directed to the TCP port 5002 of the Boston PBX 41 while the media stream 46 originating at the SJ PBX 41 is directed to UDP port 5004 of the Boston PBX 41. The control streams 43, 44 are used by all calls. There is one media stream per call from each telephone instrument but one control stream handles all calls (i.e., the control stream is not exclusive to any one particular call but used by all calls). However, while the destination port numbers of each media stream will always remain constant, the source port number of each media stream will be unique for each call. It is the unique source port number that will allow the PBXs 41, 42 to be able to distinguish one incoming data packet from another. A PBX receiving a plurality of data packets will review the source port number on each packet to sort the packets and group those with the same source port number together.

When a person in the Boston office wishes to call a person in the San Jose office, the Boston person picks up a telephone and dials a SJ extension (e.g., ext. 586). The Boston PBX 41 searches for ext. 586 in its extension table (i.e., configuration database). The configuration database lists extension 586 as being attached to slot or port number 3 of the SJ PBX 42. The Boston PBX 41 then transmits a call control message (via TCP/IP port 5002) to the SJ PBX 42 instructing the SJ PBX 42 to create a media stream. At this time, the Boston PBX 41 does not instruct the SJ PBX 42 to send the SJ-to-Boston media stream 46 to any particular port number on the Boston PBX 41. Since the Boston PBX 41 has its own media stream 45 going from Boston to SJ, there are now two media streams; one from Boston to SJ 45 and another from SJ to Boston 46. The control stream 43, 44 between the two PBX 41, 42 always exists as the control stream is used not only to communicate the source port for the media streams, but also for other functions not salient to the claimed invention. The TCP control stream is always directed to a particular destination port (e.g., 5002) chosen by the manufacturer of the system. The use of port 5002 as the TCP port is in the source code. This constant destination port number may be changed to any other number as long as the change is made on a system-wide basis.

When the extension in SJ is dialed, the Boston PBX 41 creates a Boston-to-SJ media stream 45. In the process of doing this, the SJ PBX 42 sends a message over the SJ-to-Boston control stream 44 requesting the operating system inside the Boston PBX 41 to transmit a unique port number (i.e., the source UDP port number being used by the Boston-to-SJ media stream 45) to identify the incoming media stream 45 from the Boston PBX 41. The source UDP port number communicated to the SJ PBX 42 is one that is not already in use by another media stream. Meanwhile, the SJ PBX 42 receives a message, over the Boston-to-SJ control stream 43, from the Boston PBX 41 requesting the SJ PBX 42 create a media stream and a UDP port number to identify that media stream. The SJ PBX 42 sends a TCP/IP message to Boston with a SJ UDP port number for the SJ media stream 46. Thus, the UDP port number from which each media stream originates varies per call, regardless of whether the media stream originates from the Boston PBX 41 or the SJ PBX 42. However, both the Boston PBX 41 and the SJ PBX 42 use the identical UDP port number to receive incoming media streams.

The SJ PBX 42 creates the SJ media stream 46 and unique port number which the SJ PBX 42 sends to the Boston PBX 41, via call control, identifying that a particular call originated at a particular port number. The Boston PBX 41 may request that the SJ PBX 42 provide a source port number or the SJ PBX 42 may, as part of the call control of the SJ PBX 42, automatically do so when the SJ PBX 42 creates its media stream. Both mechanisms are used. Depending upon the exact ordering of the events in the call setup (or call handoff sequence, for the case of call transfer), one or both of the mechanisms will effect the exchange. In the case of both, the excess work is discarded by the system. The Boston PBX 41 also has the programmed ability to request the UDP port number of an extant media stream in order to cover overlap in the asynchronous execution of these two symmetric algorithms. The destination port number for TCP is always 5002. The designation of which destination port number is used for UDP and which is used for TCP all comes from software within the PBX. The destination port number is compiled into the code running in the PBXs. At this point, the Boston PBX 41 has a media stream 45 uniquely identified by the IP address of the Boston PBX 41 and the UDP source port number of the Boston PBX 41 obtained when the media stream 45 was created. In SJ, the SJ media stream 46 is created and uniquely identified by the SJ IP address and SJ source port number obtained.

Each system must transfer the UDP source port number for a particular media stream from its PBX back to the PBX at the destination of the media stream. The UDP source port numbers are not transferred inside the media stream. The data inside the media stream must be uniquely identified so that the data is routed to the appropriate destination. The Boston PBX 41 sends the port number of its media stream to the SJ PBX 42 in the control stream in a different message (i.e., an "endpoint" information message) from the first message sent to command the SJ PBX 42 to create the media stream. The SJ PBX 42 does likewise. It is the unique identification of each media stream that allows the receiver task in a destination PBX to sort through a plurality of media streams from various sources and send each media stream to its intended destination. The key is to communicate the UDP port number from the source of the media stream to the destination of the media stream. Every media packet being sent from the SJ PBX 42 to the Boston PBX 41 has a destination and source IP addresses as well as destination and source port numbers. Meanwhile, the Boston PBX 41 is doing the same thing (i.e., sending packets with destination and source IP addresses as well as destination and source port numbers).

Essentially, the Boston PBX 41 sends the UDP port number of its media stream to SJ PBX 42 and the SJ PBX 42 does likewise. Both Boston and SJ send endpoint information messages to each other, including an identifier of the call and, most importantly, the UDP port number of the media stream associated with the call. This endpoint information informs each PBX that voice communication can start. This is the key to communicating the UDP port number from the source of the media stream to a recipient destination.

Port 5002 is the port number chosen by the maker of the PBX for the TCP call control hole in the firewall. Any port number could have been chosen but once chosen, the port number is fixed across the private branch exchange system. Any change in port number must be made on a system-wide basis. The TCP/IP messages are sent to the TCP port 5002, which like the UDP port number, is also chosen arbitrarily.

Port 5004 is recommended by the RTP RFC standard for UDP transmission, REF 1890, RTP Profile for Audio and Video Conferences with Minimal Control, January 1996, www-letf-org%rfc%rfc1890.txt. However, as stated above, the chosen number does not matter as long as the number is fixed across the private branch exchange system. The User is usually not authorized to change this number. The firewall administrator is usually the only one authorized to open a hole at this chosen port number.

While the data payload of each packet does not contain any identifying information, the header of each packet does contain IP address and port number information. A typical voice packet in the media stream on a Local Area Network (LAN) includes the following: Ethernet header (14 bytes), IP header (20 bytes, including the destination IP address and source IP address), UDP header (8 bytes, including destination and source port numbers), RTP header (12 bytes), and payload (10 to 160 bytes).

The two source port numbers, one for each half of a conversational media stream, are generated asynchronously by the two systems. While the destination port number varied per each call in prior systems, the instant system uses a fixed destination port which allows the system administrator to keep the holes in the firewall to a minimum. The uniquely generated source port number of each media stream is what enables the PBX to identify and distinguish which packet belongs to a particular call.

Figure 5A:
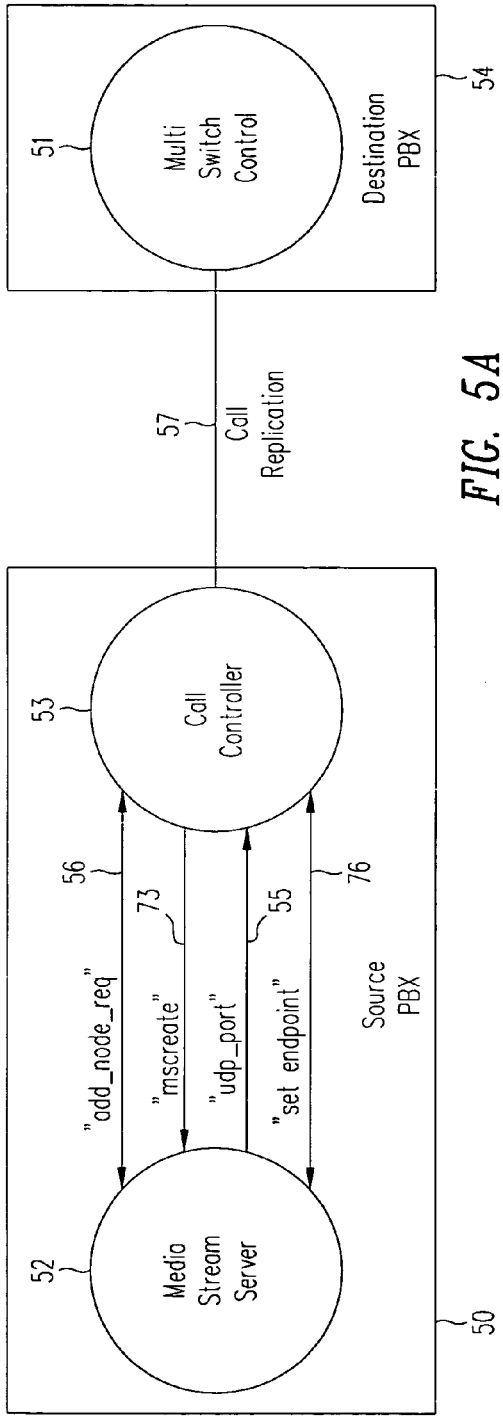
FIG. 5A illustrates an example of a call control mechanism operating between two locations.
Figure 5B:
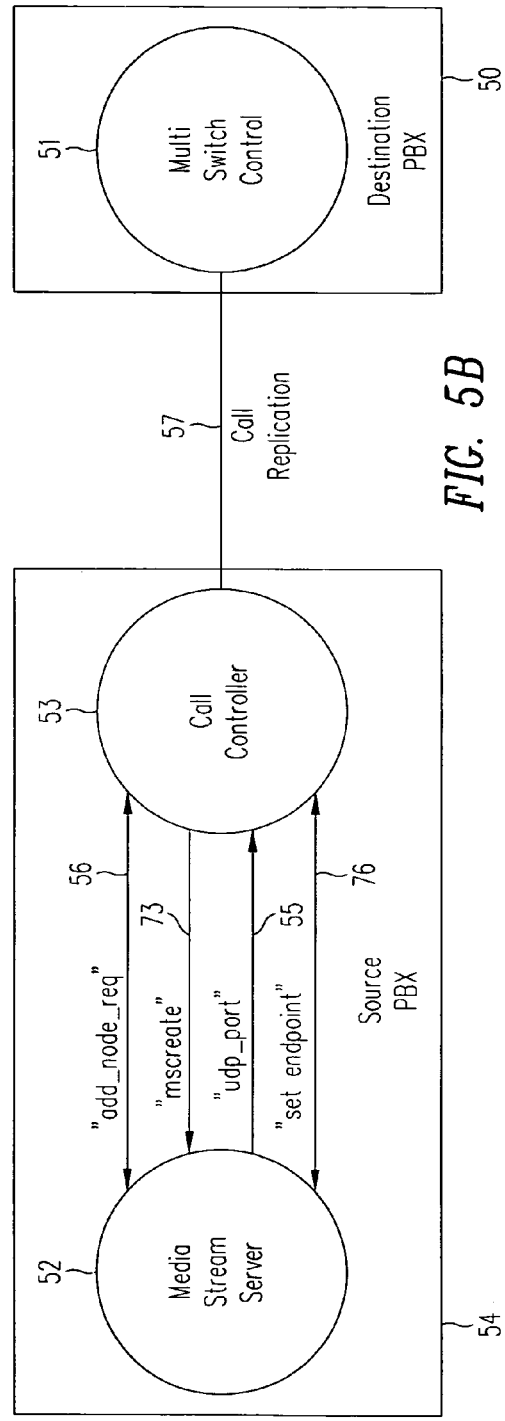
FIG. 5B illustrates an example of a call control mechanism operating between two locations.

In accordance with the invention, the actual mechanism for transmission of the uniquely identifying source port number is through the call control mechanism. FIG. 5A illustrates an example of a call control mechanism that operates between at least two PBX 50, 54 wherein PBX 50 represents call source PBX and PBX 54 represents the call destination PBX. However, each PBX in a system is capable of functioning as both a source and a destination PBX. In accordance with the invention, as seen in FIG. 5B, a call initiated from PBX 54 to a destination at PBX 50 contains identical functions to that in FIG. 5A except that PBX 54 is now the call source PBX while PBX 50 is the call destination PBX. The ultimate goal of the call control mechanism is to exchange source port numbers between PBX 50, 54. Three main functions are required to accomplish the exchange of source port numbers. Each function is represented by a bubble (FIGS. 5A and 5B) and each function operates independently of the others. The three main functions are multi switch control (ms_ctrl) 51, media stream server (ms_svr) 52, and the call controller 53. The media stream server 52 and call controller 53 are part of the source PBX 50 while the multi switch control 51 is actually part of the call controller of the destination PBX 54.

Multi switch control 51 is the replication agent for any existing call from one PBX over to another PBX. As stated above, both PBXs run the same functional blocks of code, i.e., both the 'calling' PBX and the 'called' PBX contain ms_ctrl 51, ms_svr 52 and call controller 53 (which contains the calling PBX's ms_ctrl). The replication agent is the ms_ctrl within the call controller 53 which allows the two (or more) PBX to act as if they were a single PBX.

The media stream server 52 sends and receives RTP data (i.e., payload). The media stream server 52 gathers data from the telephone instrument and sends that gathered data as RTP data. The media stream server 52 also performs the opposite function by taking RTP data from the network and converting that data into a form compatible with the telephone instrument.

The media stream server (ms_svr) 52 includes five tasks: (1) a command task that communicates with the call controller 53 to determine the media streams that collectively define a single call; (2) a receiver task that takes data from the network; (3) a sender task that sends data to the network; (4) a player task that works with the receiver task to manage the incoming data jitter buffers; and (5) a proxy task that forwards the media to voice mail in a format compatible with voice mail.

As the media stream server 52 and multi switch control 51 do not communicate directly with each other, the call controller 53 is an intermediary between the two functions. The call controller 53 is necessary to communicate the source port numbers between media stream server 52 and multi switch control 51. Communication between the call controller 53 and media stream control is focused on call replication 57. Call replication is a generic term applied to all communication between the media stream server 52 and the multi switch control 51 regarding the set-up and identification of each media stream.

As discussed in more detail below, several messages run between the media stream server 52 and the call controller 53. These messages include "mscreate" 73, "udp_port" 55, "add_node_req" 56, and "set endpoint" 76.

In accordance with the invention, as seen in FIG. 6, linked lists 61 connect the command task 62, receiver task 63, sender task 64, and player task 65. The linked lists are an in-memory data structure, which is shared by all the running tasks enumerated above. Network data 66 enters the media stream server 52 and is sent to the receiver task 63. The receiver task 63, as will be explained below, sends the data to a particular incoming jitter buffer 67, depending on the source port number and source IP address of the data. A representative jitter buffer is fully disclosed in co-pending U.S. patent application Ser. No. 09/314,593 (Attorney Docket No. M-7547 US), entitled "Increasing Duration Of Information In A Packet To Reduce Processing Requirements", which is herein incorporated by reference for all purposes. Each incoming jitter buffer 67 is set up for packets from a particular source port number and source IP address. The data is then passed to the player task 65 which works in conjunction with receiver task 63 to manage the buffered data and the incoming data jitter buffers 67. The player task 65 converts incoming network data to an analog signal at the speaker 68 of the dialed telephone instrument (i.e., correct destination).

Outgoing data originates from a microphone 69A of the telephone and is run through a codec 69B. Data from the codec 69B is then passed to the Digital Signal Processor (DSP) 69C. The DSP 69C takes individual samples of data from the network buffers, and meters them out to Digital-to-Analog Converters (DACs) located on the line card in the telephony switch in an exact time sequence. The DSP 69C then sends the data to the sender task 64. The sender task 64 breaks up the data and places it into a particular network buffer 60 which then sends the data out of media stream server (ms_svr) 52. The data is sent as RTP packets, encapsulated with UDP, IP, and Ethernet headers. The command task 62 is in communication with the linked lists 61 and with the outside system (not shown).

The command task 62 sets up the UDP source port number, manages the communication channels running between the command task and call control 53 as well as the asynchronous communication with the call control 53 in the PBX. The command task 62 opens two communications channels, or pipes, to call controller 53. The two pipes, collectively known as 'the command pipe', are the request pipe ("pipe_ms_ctl_cmds") and the response pipe ("pipe_ms_ctl_resps"). The request pipe is used to send requests from the call controller 53 to the command task 62 and the response pipe is used to send responses back to the call controller 53 from the command task 62. The command task 62 reads off of the command pipe. Each task (sender, receiver, command, proxy) ends up as an infinite loop.

Figure 7:
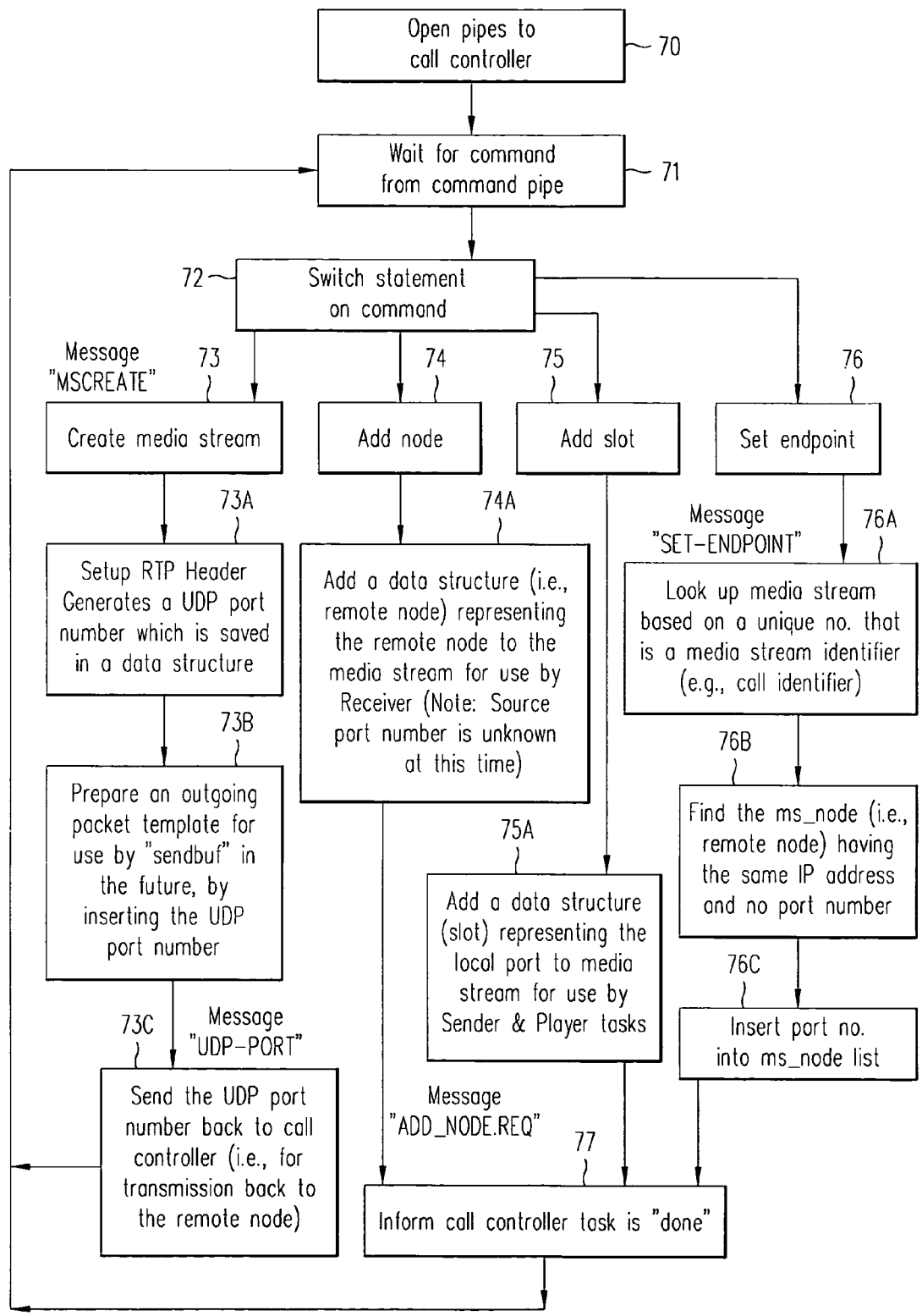
FIG. 7 illustrates an example of the command task.

In accordance with the invention, as seen in FIG. 7, the command task 62 first opens pipes 70 to the call controller 53 from the media stream server 52. The command task is started at system initialization. The command task 62 then waits for one of four possible commands from the command pipe 71 (i.e., from the request pipe): "media stream create"

73, "add a node" 74, "add a slot" 75, and "set endpoint" 76. A switch statement coming from the command pipe directs which command is to be executed 72.

The first possible command is media stream create ("mscreate") 73. The end result of this command is the creation of a media stream. This command may be generated by the call controller 53 in response to local or remote telephone being used. In summary, the command task 62 calls to "set up RTP header" and generates a UDP source port number which is saved in the linked list 61 data structure (See 73A). An outgoing packet template is prepared with a header for later use by "sendbuf" 73B. This template is used over and over every time a packet is sent as the UDP port number has been inserted into the packet template 73B. After receiving a message "udp_port" 55, mscreate 73 will then send the UDP source port number back to call control 53 for transmission back to remote node 73C. The command task then waits for a command from the command pipe 71. This command task initiates the media stream for the call. After that, the next thing to be done is to add the extension for the call. The next thing the call controller 53 does is "add_slot" which adds a slot.

The second possible command is to add a node ("add node") 74. In summary, "add node" adds a node to the system even though it is not aware of which port this information is for, informs the system a node was added, and puts the port information into the media stream node (msnode), searches for the media stream identifier (i.e., the unique number of the media stream), finds the media stream node with that particular IP address, and sends a reply (to the request to add a node) to the call controller 53 saying that the task of adding a node to the data structure 61 has been done. This command augments the data structure, or builds the data structure 61, which is shared by all the media stream tasks. This data structure is not strictly for use by the Receiver task as the sender uses it also for outgoing voice data. It must be noted that the source port number is unknown to the destination PBX at this time. A message "add_node_req" 56, requesting that a node be added, is sent to the call controller 53 which is informed when "add_node" is done 77. The command task then waits for a command from the command pipe 71.

The third possible command is to add a slot 75. In summary, the "add slot" command is used whereby the slot is added as a local extension to the media stream (i.e., a structure representing the local port is linked on to the local media stream), and then informs call control that it is done.

This command sends a message, "add_slot_req", from the call controller 53 to the command task. The command adds a data structure (i.e., slot) representing the local port to the media stream for use by the Sender and Player tasks 75A. A message is sent informing call controller that "add_slot" is done 77. The command task then waits for a command from the command pipe 71.

The fourth possible command is to "set_endpoint" 76. This command searches for a media stream based on a unique number that is the media stream identifier (e.g. call identifier) 76A. The command finds the remote node ("ms_node") having the same IP address and no port number 76B. The command then inserts the port number into the ms_node list 76C. A message is sent informing call controller that "set_endpoint" is done 77. The command task then waits for a command from the command pipe 71.

Figure 8:
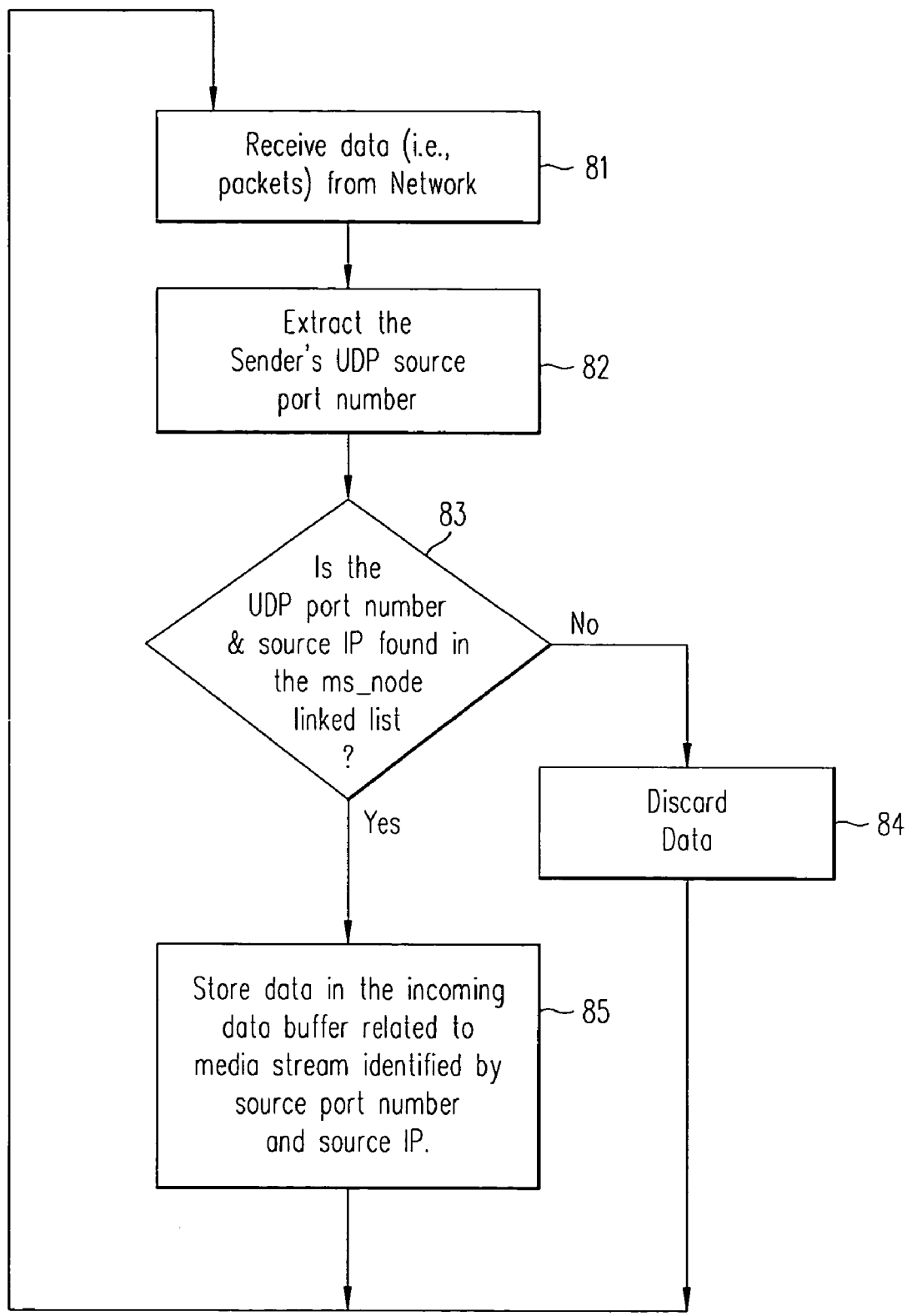
FIG. 8 illustrates an example of the receiver task.

In accordance with the invention, FIG. 8 illustrates receiver task 63. Receiver task 63 takes data off the network. The only job receiver task 63 has is to take packets off UDP 5004 (i.e., the incoming source media stream) and send the packets on their way to an appropriate incoming data buffer 67 based on the source IP and source port addresses of the data. A "table" in the PBX contains the source IP and source port numbers that are matched to local telephone extensions. The receiver task 63 listens on port 5004 for incoming packets, takes a packet in, determines the source of the packet based on source IP address and UDP port number, and then identifies the media stream nodes (msnodes).

Figure 11:
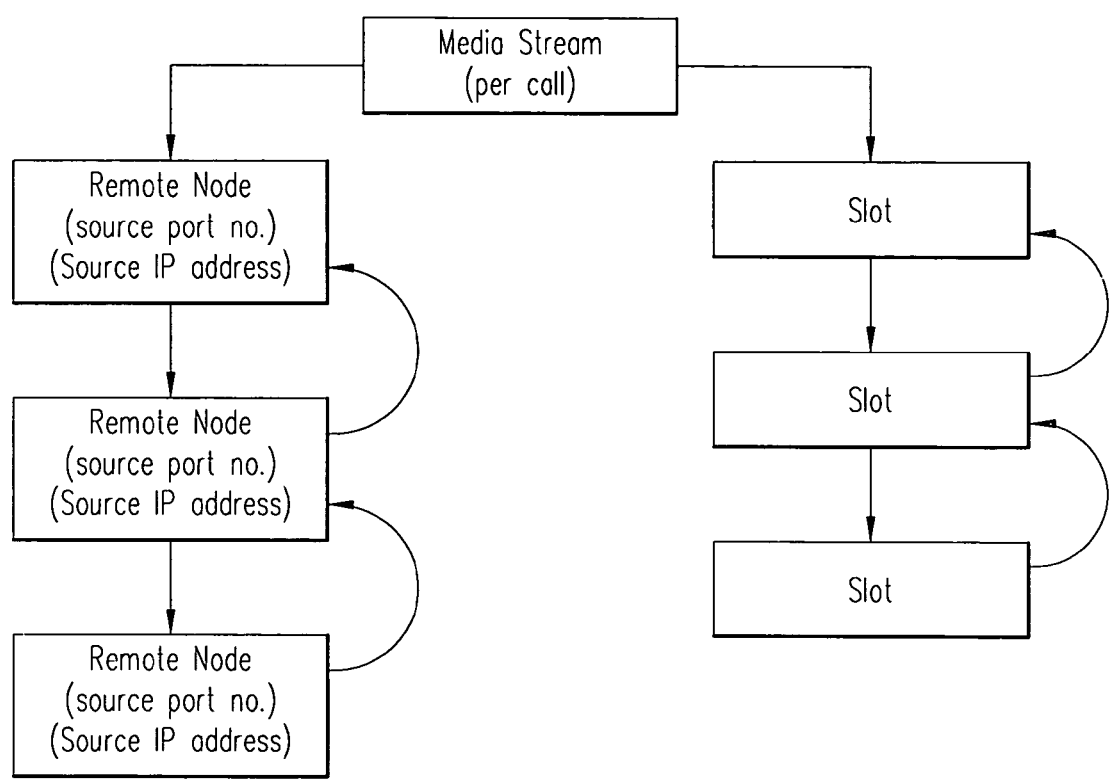
FIG. 11 illustrates that the receiver task going through the linked lists to determine find the remote node.
Figure 12:
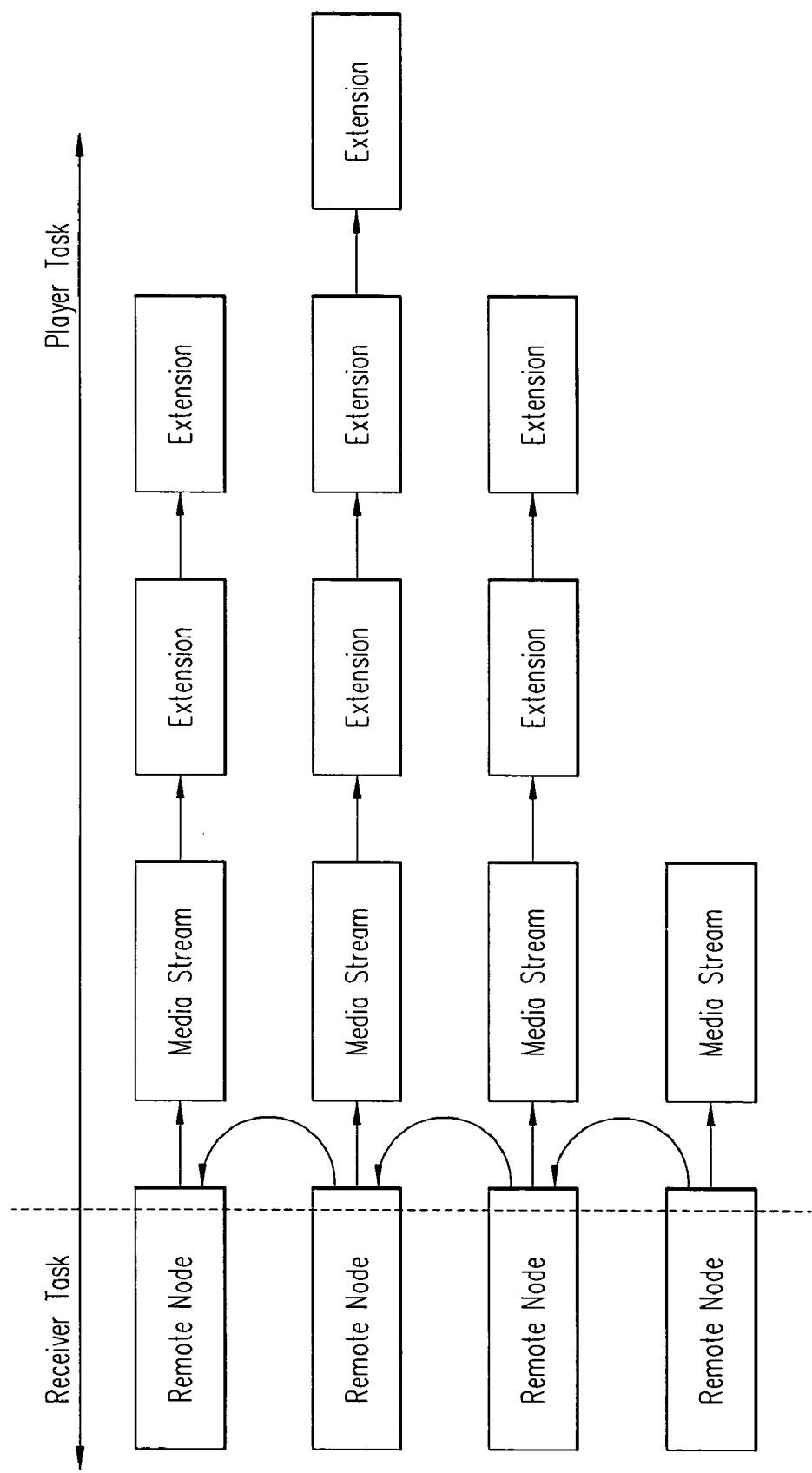
FIG. 12 illustrates how the receiver and player tasks use the linked lists to send each media stream to an appropriate destination.

In accordance with the invention, the media stream node linked list 61 is used by the receiver task 63 to find a particular remote node, as seen in FIG. 11. Once the receiver task 63 matches the source port number and IP with the remote nodes, the receiver task 63 hands over the information to the player task 65 at the end of the remote nodes, as seen in FIG. 12. The receiver task 63 is involved with the incoming jitter buffers 67. The ms_node linked list 61 is what binds all of these tasks together.

The receiver task uses the linked list of remote nodes and walks through this list to find the particular remote node. The receiver task transfers the information over to the player task which then searches for the media stream which has a pointer to the extension list, as seen in FIG. 12. The receiver task takes data off UDP port 5004 and determines which call (i.e. media stream) each packet belongs to using source IP and source port address to identify the appropriate media stream and then sends the data to the appropriate extension (s). It then finds the remote node ("msnode" in the source code) based on the source port number. The task then extracts the sender's UDP port number. It then finds the media stream from the remote node and converts the data from an encoded format. A field in the RTP header designates the encoding format. The conversion applied by the receiver task is from the encoded format to a linear format.

In accordance with the invention, as seen in FIG. 8, the receiver task 63 receives data (i.e., packets) from the network 81. The receiver task 63 extracts the UDP port number of the sender 82. The receiver task 63 then determines 83 if the UDP port number and source IP are found in the ms_node linked list 61. If not 84, the data is discarded and the receiver task 63 waits to receive more data from the network. If the UDP port number and source IP are found in the linked list 61, then the data is stored in the incoming jitter buffer 67 related to the media stream identified by source port number and source IP address 85. The receiver task 63 waits to receive more data from the network 81. The receiver task 63 accesses the linked list of remote nodes (ms-node list) 61 and walks through this list 61 to find the particular remote node and searches for the media stream which has a pointer to the extension list.

The sender task 64 gets data from the handset microphones 69A (a CODEC 69B is used to convert the data to a usable format). The sender task 64 takes incoming data off local extensions (DSP data essentially). The sender task runs every 10 milliseconds by taking in coming DSP data off the local extensions and building the outgoing buffers 60. When a buffer 60 fills up, the sender task 64 sends out the full buffer of payload by using the command, "sendbuf". After building up data from DSP 69C, "sendbuf" searches through the linked list 61 to determine if any media streams are related to the full buffer of payload in order to send data out to each remote node that is attached to the media stream whose buffer is full. The command "sendbuf" attaches the RTP header. The UDP port number is created when the media stream is created. The UDP header is created and includes the UDP port number previously created. UDP source port number is filled into buffer. This UDP port number is associated with the media stream moving data from the source telephony switch (e.g., the microphone on a handset) to another telephony switch (e.g., to be played out of the speaker on another handset). A query is needed to get the number out of the operating system.

During "ms_create" in the command task, the operating system is instructed to assign a port number but the operating system keeps the number to itself. The port number assigned from the operating system is queried. The port number assigned is saved in the linked data structures, and are used by the sender task.

Figure 9:
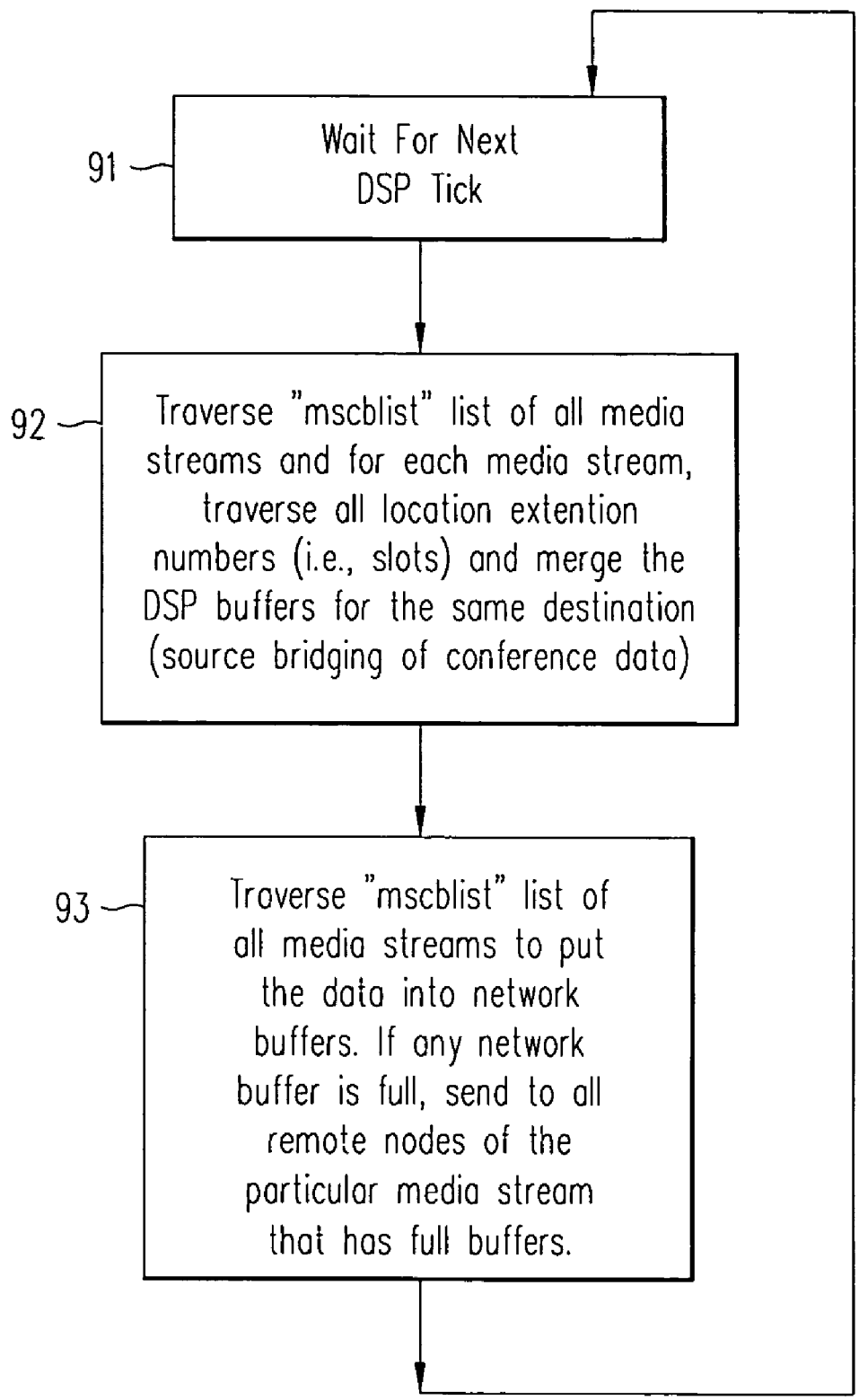
FIG. 9 illustrates an example of the sender task.

In accordance with the invention, as seen in FIG. 9, the sender task 64 waits for the next DSP tick 91. The sender task 64 then traverses the ("mscblist") list of all media streams and, for each media stream, traverses all local extension numbers (i.e., slots) and merges the DSP buffers for the same destination (i.e., source bridging of conference data) 92. The sender task then traverses ("mscblist") the list of all media streams to put the data into the network buffers and if any network buffer is full, sender task sends to all remote nodes of the particular media stream that has a full buffer 93. Sender task then resumes waiting for the next DSP tick 91.

As seen in FIG. 6, the player task 65 works in conjunction with the receiver task 63 to manage the buffered incoming data and incoming jitter buffers. The player task 65 takes the buffered data and plays the data into the headphone of the telephone instrument.

The proxy task ends up going through "send_buf", as discussed above. The proxy task forwards the media to voicemail in a form voicemail likes (i.e., proxy task changes the format). Proxy task sends data to the network and stands between voicemail and an extension. Proxy task is sending data from one PBX to another PBX; 10 millisecond packets are changed into 125 millisecond packets linearly encoded. All media packets to and from the network uses the constant destination port number and varying source port number.

The call controller 53 encompasses everything other than the media stream server 52 and the multi switch control 51. In summary, the call controller 53 interacts with the command process. The command "create call" creates a unique media stream identifier used to identify a media stream at the media stream layer and then adds parties. The call controller 53 uses the media stream identifier to create a unique media stream, gets UDP port number and stores it. If remote parties are involved in the call, then the remote parties are informed of the unique source port number via TCP message through the msctrl mechanism. However, this message is not sent until call controller 53 knows there are remote parties.

Figure 10:
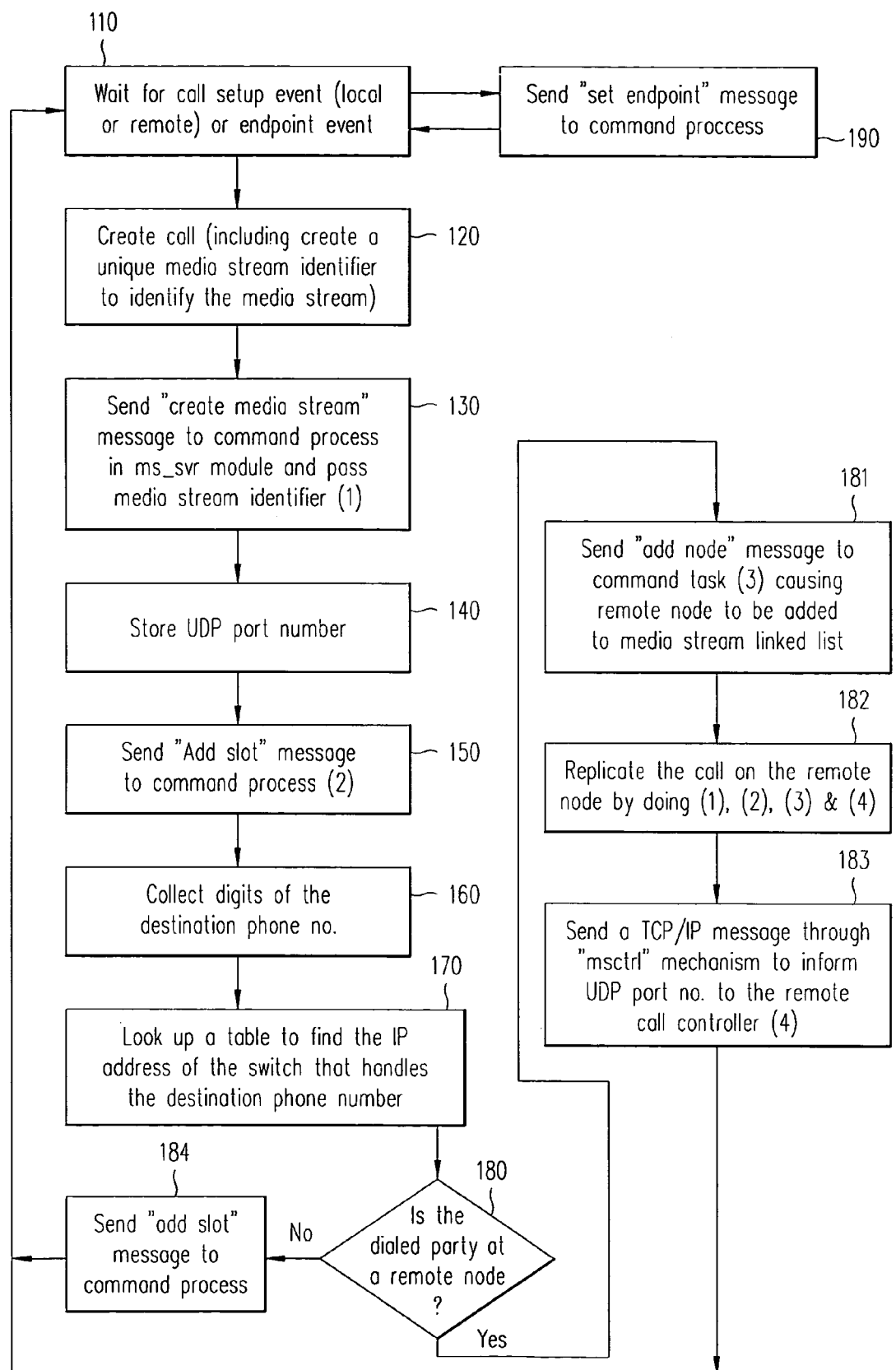
FIG. 10 illustrates an example of the c all controller.

In accordance with the invention, as seen in FIG. 10, the call controller 53 waits for a call setup event (local or remote) or an endpoint event 110. If there is a setup event, call controller 53 creates a call. This includes creating a unique media stream identifier to identify the media stream 120. The call controller 53 then sends a "create media stream" message to the command process in "ms_svr" module 52 and passes the media stream identifier 130 to the command process. This is step (1). Once this is done, the call controller 53 stores the resulting UDP port number 140 in a data structure of its own. The call controller 53 then sends an "add slot" message to the command process 150. This is step (2). The call controller 53 then collects digits of the destination phone number 160. The call controller 53 then searches a table (i.e., configuration database) to find the IP address of the PBX switch 54 that handles the destination phone number 170. The call controller 53 then determines if the dialed party is at a remote node 180. If the dialed party is at a remote node, then call controller 53 sends an "add node" message to the command task 181 (this is step (3)). This "add node" message adds the remote node to media stream linked list 181. The call controller 53 reviews all messages between msctrl 51 and replicates the call on the remote node by repeating steps (1), (2), (3) & (4) 182. Once that is done, call controller 53 sends a TCP/IP message to the destination PBX 54 through the "msctrl" mechanism 51 to inform the remote call controller (i.e., destination PBX 54) of the UDP source port number 183. The call controller 53 then waits once again for a call setup event 110.

If the dialed party is not at a remote node, the call controller 53 sends an "add slot" message to the command process 184. The call controller 53 then once again waits for a call setup event or endpoint event 110.

If there is an endpoint event, call controller 53 sends a "set endpoint" message to the command process 190. The call controller 53 again waits for a call setup event or endpoint event 110.

There are alternative ways to identify the source of each call other than by source port number. As stated above, the RTP header in each media stream packet is 12 bytes in size. The RTP header is comprised of 4 bytes of time stamp, a 2 byte sequence number, 4 bytes for synchronous source identifier (SSRC), and 2 bytes for RTP header extensions.

The SSRC can be used to uniquely identify the source of media stream being sent. However, the SSRC can be changed at any point by the media stream generator. Systems could use the SSRC to identify the media stream source but the method to do so is more complex than identifying by source port number. In order to use the SSRC, the media generator requires a control channel to communicate the changes in SSRC in a time-sensitive, synchronized fashion in order to avoid loss of data. The source could change the SSRC in the middle of a call. However, if someone else uses the same identifier, the media streams of each user using the same identifier collide and both sources have to use new SSRC numbers. Thus, the SSRC is one way to use the RTP header to identify media streams.

The header extension could be used to identify the source of the media streams but this method is less efficient since the network data representing the stream will be larger, consuming more network bandwidth. This method may also be less efficient when deployed with available routing equipment, which, upon recognition of such a header extension, may cease to compress packets traveling over a slow network link.

The 2 bytes in the RTP header for extensions can describe the encodings for payload type and the existence of merged conference streams (i.e. conference calling). These 2 bytes can also indicate the existence of extensions (i.e., whether the header has been extended). These two bytes can be made to stand for whatever the user wants the two bytes to indicate, including, but not limited to, the source of the RTP data.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as falling within the true spirit and scope of this invention.

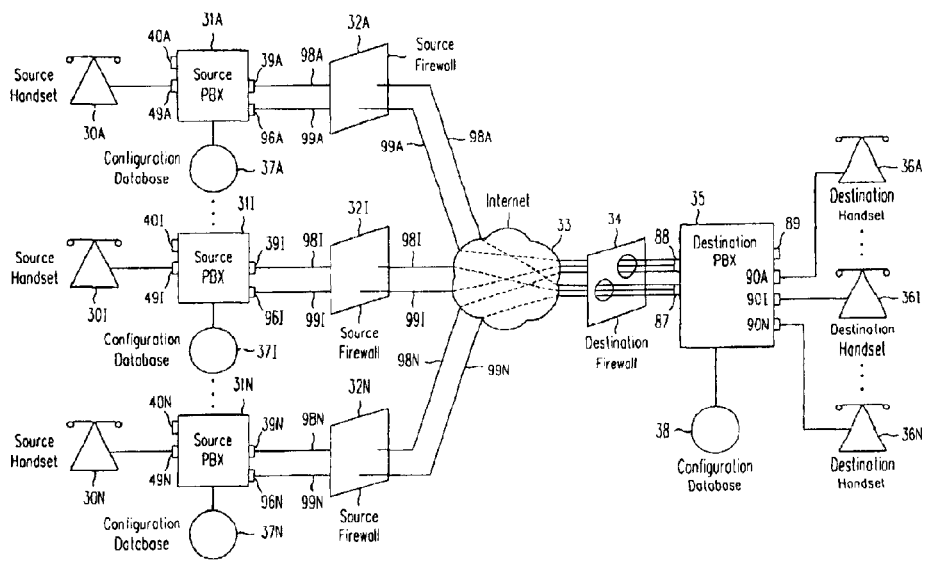

We claim:

1. A method of communication between at least two private branch exchanges including a source private branch exchange and a destination private branch exchange, the method comprising:

sending a first media stream from the source private branch exchange to a first port predetermined for media streams at the destination private branch exchange;

sending a first control stream from the source private branch exchange to a second port predetermined for control streams at the destination private branch exchange;

wherein the first control stream comprises a first unique identifier of the first media stream;

wherein the first port and the second port have port numbers different from each other;

sending a second media stream from the destination private branch exchange to a third port predetermined for media streams at the source private branch exchange;

sending a second control stream from the destination private branch exchange to a fourth port predetermined for control streams at the source private branch exchange;

wherein the second control stream comprises a second unique identifier of the second media stream; and wherein the third port and the fourth port have port numbers different from each other.

2. The method of claim 1 wherein each media stream is communicated by a UDP protocol.

3. The method of claim 1 wherein each control stream is communicated by a TCP protocol.

4. The method of claim 1 wherein each media stream further comprises audio traffic.

5. The method of claim 1 wherein each media stream further comprises video traffic.

6. The method of claim 1 wherein a firewall is located between the source private branch exchange and the destination private branch exchange, wherein the firewall has at least a first hole and a second hole, and wherein the first media stream is received at the first port via the first hole in the firewall, and the first control stream is received at the second port via the second hole in the firewall.

7. A method of receiving telephony traffic over an IP network, the method comprising:

receiving at least a first media stream in a first port for telephony data traffic at a first one of the plurality of destinations;

receiving at least a second media stream in the first port predetermined for telephony data traffic at a second one of the plurality of destinations;

receiving at least a first call control stream in a second port predetermined for call control traffic at the first one of the plurality of destinations;

wherein the first call control stream comprises a first unique identifier of the first media stream; and receiving at least a second call control stream in the second port predetermined for call control traffic at the second one of the plurality of destinations;

wherein the second call control stream comprises a second unique identifier of the second media stream; and wherein the first port and the second port have port numbers different from each other.

8. The method of claim 7 wherein each media stream is communicated by a UDP protocol.

9. The method of claim 7 wherein each control stream is communicated by a TCP protocol.

10. The method of claim 7, wherein each media stream is comprised of a plurality of packets.

11. The method of claim 7 wherein each media stream further comprises a mixture of audio and video traffic.

12. The method of claim 7 wherein the telephony traffic passes through a firewall, wherein the firewall has at least a first hole and a second hole, and wherein the first media stream is received at the first port via the first hole in the firewall, and the first control stream is received at the second port via the second hole in the firewall.

* * * * *

UNITED STATES PATENT AND TRADEMARK OFFICE
CERTIFICATE OF CORRECTION

PATENT NO. : 7,167,486 B2  Page 1 of 1
APPLICATION NO. : 09/766027
DATED : January 23, 2007
INVENTOR(S) : David Cornelius and Edwin Basart It is certified that error appears in the above-identified patent and that said Letters Patent is hereby corrected as shown below:

Column 20, line 35, add the following text:
13. The method of claim 1 wherein each media stream is comprised of a plurality of packets.
14. The method of claim 1 wherein the first unique identifier is a source port number of the first media stream.
15. The method of claim 1 wherein the first unique identifier is the source IP address of the first media stream.
16. The method of claim 1 wherein the first unique identifier is further comprised of a source port number and the source IP address of the first media stream.
17. The method of claim 7 wherein the first unique identifier is a source port number of the first media stream.
18. The method of claim 7 wherein the first unique identifier is the source IP address of the first media stream.
19. The method of claim 7 wherein the first unique identifier is comprised of a source port number and the nsource IP address of the first media stream.

Signed and Sealed this

Twenty-fifth Day of May, 2010

David J. Kappos
*Director of the United States Patent and Trademark Office*

UNITED STATES PATENT AND TRADEMARK OFFICE
CERTIFICATE OF CORRECTION

PATENT NO. : 7,167,486 B2
APPLICATION NO. : 09/766027
DATED : January 23, 2007
INVENTOR(S) : David Cornelius and Edwin Basart It is certified that error appears in the above-identified patent and that said Letters Patent is hereby corrected as shown below:

Delete the Title page and substitute therefore the attached title page showing the corrected number of claims in the patent
Column 20, line 35, add the following text:
13. The method of claim 1 wherein each media stream is comprised of a plurality of packets.
14. The method of claim 1 wherein the first unique identifier is a source port number of the first media stream.
15. The method of claim 1 wherein the first unique identifier is the source IP address of the first media stream.
16. The method of claim 1 wherein the first unique identifier is further comprised of a source port number and the source IP address of the first media stream.
17. The method of claim 7 wherein the first unique identifier is a source port number of the first media stream.
18. The method of claim 7 wherein the first unique identifier is the source IP address of the first media stream.
19. The method of claim 7 wherein the first unique identifier is comprised of a source port number and the source IP address of the first media stream.

This certificate supersedes the Certificate of Correction issued May 25, 2010.

Signed and Sealed this

Twenty-second Day of June, 2010

David J. Kappos
*Director of the United States Patent and Trademark Office*

CERTIFICATE OF CORRECTION (continued)

United States Patent
Cornelius et al.

(10) Patent No.: US 7,167,486 B2
(45) Date of Patent: Jan. 23, 2007

(54) VOICE TRAFFIC THROUGH A FIREWALL

(75) Inventors: David Cornelius, Saratoga, CA (US); Edwin J. Basart, Los Altos, CA (US)

(73) Assignee: Shoretel, Inc., Sunnyvale, CA (US)

(*) Notice: Subject to any disclaimer, the term of this patent is extended or adjusted under 35 U.S.C. 154(b) by 726 days.

(21) Appl. No.: 09/766,027

(22) Filed: Jan. 19, 2001

(65) Prior Publication Data
US 2003/0165136 A1 Sep. 4, 2003

(51) Int. Cl.
H04J 4/16 (2006.01)

(52) U.S. Cl. .................. 370/467
(58) Field of Classification Search ........... 370/401, 370/466, 352, 260, 261, 355, 228, 351; 345/419; 711/4
See application file for complete search history.

(56) References Cited

U.S. PATENT DOCUMENTS

| | | | | |
|---|---|---|---|---|
| 6,134,235 A * | 10/2000 | Goldman et al. | | 370/352 |
| 6,470,020 B1 * | 10/2002 | Barker et al. | | 370/401 |
| 6,697,377 B1 * | 2/2004 | Ju et al. | | 370/466 |
| 6,760,309 B1 * | 7/2004 | Rochberger et al. | | 370/235 |
| 6,804,254 B1 * | 10/2004 | Pearce et al. | | 370/467 |
| 6,826,176 B1 * | 11/2004 | Siddiqui et al. | | 370/352 |
| 6,922,786 B1 * | 7/2005 | Ong | | 704/270 |

OTHER PUBLICATIONS

Douglas Comer, Internetworking with TCP/IP Principles, Protocols, and Architectures, Prentice Hall, Published 1995, 4th Edition, pp. 97-99, 197-206, 221-222, & 542-549.*
Douglas E. Comer, Internetworking with TCP/IP Principles, Protocols, and Architecture, Fourth Edition, Prentice Hall, dated 1995, pp. 197-202 7 209-222.*
Douglas E. Comer, Internetworking with TCP/IP Principles, Protocols, and Architectures, Fourth Edition, Prentice Hall, dated 1995, pp. 197-202 & 209-222.*
IETF, Request for Comments (RFC) 2543: "Session Initiation Protocol" (SIP) (Mar. 1999).

* cited by examiner

Primary Examiner—Doris H. To
Assistant Examiner—Robert W. Wilson
(74) Attorney, Agent, or Firm—Silicon Valley Patent Group LLP

(57) ABSTRACT

The number of holes that are opened in a firewall for internet telephony is limited to a first hole used for call control and a second hole used for audio traffic. Fixed destination ports for telephony traffic and call control traffics are created at a destination. Media streams are received at the telephony fixed destination port. The source of each media stream is commanded to provide a unique identifier for each media stream arriving at the destination from each source. Each media stream is identified by a unique identifier provided by the source. The unique identifier for each media stream is communicated to the destination by each source over call control. All telephony traffic is received only at the fixed destination port or telephony and all call control is received only at the fixed destination port for call control.

19 Claims, 11 Drawing Sheets